Patented Dec. 8, 1936

2,063,254

UNITED STATES PATENT OFFICE 2,063,254

CHROME PIGMENTS

Ekbert Lederle, Ludwigshafen-on-the-Rhine, Germany, assignor to I. G. Farbenindustrie Aktiengesellschaft, Frankfort-on-the-Main, Germany No Drawing. Application December 12, 1933, Serial No. 701,983. In Germany December 15, 1932

8 Claims. (Cl. 134—58)

The present invention relates to new valuable chrome pigments and a process of producing same.

In Patent No. 1,926,447 there have been described from yellow to red pigment coloring matters comprising mixed crystals of lead chromate and at least one salt of lead with an acid selected from the group consisting of molybdic and tungstic acid, a part of the lead being replaceable by barium and/or strontium and a part of the said acid radicles by the radicle of sulphuric acid.

I have now found that mixed crystals comprising basic lead chromate and at least one basic salt of lead with one of the acids molybdic and tungstic acid constitute valuable yellow to red pigment coloring matters. The mixed crystals may contain basic lead sulphate as a further component and a part of the basic lead chromate may be replaced by compounds which are isomorphous therewith, as for example basic alkaline earth chromates, molybdates and tungstates. The mixed crystals usually contain at least 5 per cent of lead molybdate and/or lead tungstate. The proportions of the different components, also of sulphates if such are present at all, depend on the strength of color and the shade desired.

The mixed crystals of the kind defined above are obtained by causing an alkaline reacting compound to react in an aqueous medium with a compound comprising lead chromate in the presence of a salt of at least one of the acids selected from the class consisting of molybdic and tungstic acid. The preparation of the chrome pigments is preferably effected by the treatment of mixed crystals of the type $Pb(Cr,X)O_4$ in which $X$ represents molybdenum and/or tungsten, such as are obtainable according to the said Patent 1,926,447 with solutions having an alkaline reaction, as for example aqueous solutions of the hydroxides or carbonates of the alkali metals or ammonium. Mixed crystals which contain basic lead sulphate as a further component and those in which a part of the lead chromate is replaced by compounds which are isomorphous therewith, as for example alkaline earth metal chromates, may also be employed as initial materials. Alkaline earth metal hydroxides, for example, may also be employed for the reaction, especially in cases when lead sulphate is present in the initial materials, a part of the lead chromate thus being isomorphously replaced by alkaline earth metal sulphate.

The basic lead chromate colors according to this invention may also be prepared for example by causing basic lead compounds, such as white lead, or solutions of basic lead compounds, as for example of basic lead acetate, to react with solutions of alkali metal chromates or bichromates, alkali metal molybdates or ammonium molybdate and/or alkali metal tungstate or ammonium tungstate, if desired together with salts of sulphuric acid, or by causing neutral or slightly acid solutions of lead salts to act on alkaline or ammoniacal chromate, molybdate and/or tungstate solutions, which may also contain sulphates. If basic lead compounds such as white lead or basic lead acetate are used in the manner described afore, by their reaction for example with alkali metal chromates on the one side lead chromate and on the other side alkaline reacting compounds are formed the interaction of which results in the production of basic mixed crystals in accordance with the present invention. Furthermore the chrome pigments may be obtained by the treatment of lead chromate or mixed crystals of lead chromate and compounds isomorphous therewith in aqueous suspension with alkaline or ammoniacal molybdate and/or tungstate solutions.

The mixed crystals according to the present invention are distinguished by good fastness to light and lime and their strength of color even when they contain only very little molybdenum or tungsten, is in some cases more than double that of other basic lead chromate colors of the same shade of color, their appearance being considerably more brilliant.

The following examples will further illustrate the nature of this invention but the invention is not restricted to these examples.

Example 1

32 kilograms of a red chrome pigment, consisting of 70 per cent of lead chromate, 20 per cent of lead sulphate and 10 per cent of lead molybdate, are suspended in 200 litres of water. Into the boiling mixture, a solution of 10.6 kilograms of anhydrous sodium carbonate in 50 litres of water is allowed to flow and the whole is boiled for from 10 to 20 minutes. After filtering and drying, a fiery red pigment of good fastness to light, good stability to alkali and great strength of color is obtained. By reason of its excellent strength of color, the pigment may be diluted to a great extent with the usual fillers and spreading agents; the reaction may also be carried out in the presence of substrata.

Example 2

33.5 kilograms of a yellow pigment consisting of 85 per cent of lead chromate and 15 per cent of lead tungstate are suspended in 100 litres of water and treated with 11.2 kilograms of caustic potash dissolved in 50 litres of water in the manner described in Example 1. An orange-red pigment is obtained which when used in oil-paints possesses a still higher covering power than that obtainable according to Example 1.

Example 3

32 kilograms of the red chrome pigment used according to Example 1 are stirred intensely with 200 litres of water, the suspension being heated up to between 80 and 90° C. by introducing steam. Slaked lime is added in an amount corresponding to 7.5 kilograms of $Ca(OH)_2$. A brilliant red pigment is obtained which in consequence of its content of calcium sulphate has a low specific gravity.

Example 4

77.6 kilograms of white lead are stirred intensely with 250 litres of water. A solution of 23.5 kilograms of potassium bichromate, 1.4 kilograms of anhydrous sodium sulphate and 1.9 kilograms of ammonium molybdate in 250 litres of water is added. The mixture is heated to boiling for a short time whereby an orange-red pigment is formed.

Example 5

31.5 kilograms of a chromate pigment consisting of 60 per cent of lead chromate and 40 per cent of lead sulphate are suspended in 200 litres of water. A solution of 2 kilograms of sodium molybdate and 8 kilograms of caustic soda in 50 litres of water is added. The mixture may then be treated at elevated temperature. In dependence on the period of treatment and the temperature used pigments of different color are obtained. By a treatment under stronger conditions, i. e. at high temperature for several hours, products of redder color are obtained while the color of products obtained under milder conditions, i. e. at a slowly elevated temperature for a short time, is more yellowish.

Example 6

30 kilograms of a pigment consisting of 60 per cent of lead chromate and 40 per cent of strontium chromate are suspended in 200 litres of water and treated as described in Example 1. A red pigment is obtained which in consequence of its content of strontium has a low specific gravity and therefore does not deposit when used in oil paints and the like.

What I claim is:—

1. The process of producing from yellow to red basic chrome pigments which comprises causing an alkaline reacting compound selected from the class consisting of the hydroxides and carbonates of the alkali metals and ammonium and the hydroxides of the alkaline earth metals to react in an aqueous medium with a compound comprising lead chromate in the presence of a salt of at least one of the acids selected from the class consisting of molybdic and tungstic acids.

2. The process of producing from yellow to red basic chrome pigments which comprises causing an alkaline reacting compound selected from the class consisting of the hydroxides and carbonates of the alkali metals and ammonium and the hydroxides of the alkaline earth metals to react in an aqueous medium with a compound comprising lead chromate in the presence of a sulphate and a salt of at least one of the acids selected from the class consisting of molybdic and tungstic acids.

3. The process of producing from yellow to red basic chrome pigments which comprises causing an alkaline reacting compound selected from the class consisting of the hydroxides and carbonates of the alkali metals and ammonium and the hydroxides of the alkaline earth metals to react in an aqueous medium with a compound comprising lead chromate in the presence of a salt of a metal selected from the class consisting of barium, strontium and calcium and in the presence of a salt of at least one of the acids selected from the class consisting of molybdic and tungstic acids.

4. The process of producing from yellow to red basic chrome pigments which comprises treating mixed crystals of the type $Pb(Cr,X)O_4$ wherein X represents at least one of the elements molybdenum and tungsten, with an aqueous solution of a compound selected from the class consisting of the hydroxides and carbonates of the alkali metals and ammonium and the hydroxides of the alkaline earth metals.

5. Mixed crystals suitable as yellow to red pigment coloring matters comprising basic lead chromate and at least one basic salt of lead with one of the acids selected from the class consisting of molybdic and tungstic acids.

6. Mixed crystals as claimed in claim 5 containing basic lead sulphate incorporated in their crystal structure.

7. Mixed crystals as claimed in claim 5 containing in addition to the lead salts, a metal salt selected from the class consisting of the alkaline-earth metal chromates, sulphates, tungstates and molybdates.

8. Mixed crystals as claimed in claim 5 containing basic lead sulphate incorporated in their crystal structure and in addition to the lead salts, a metal salt selected from the class consisting of the alkaline-earth metal chromates, sulphates, tungstates and molybdates.

EKBERT LEDERLE.